US009894175B2

(12) United States Patent
Little et al.

(10) Patent No.: US 9,894,175 B2
(45) Date of Patent: Feb. 13, 2018

(54) SYSTEM AND METHOD FOR INTEGRATING A DISTRIBUTED IN-MEMORY DATA GRID INTO A DISTRIBUTED CACHING SYSTEM IN A TRANSACTIONAL PROCESSING ENVIRONMENT

(71) Applicant: Oracle International Corporation, Redwood Shores, CA (US)

(72) Inventors: Todd Little, Palatine, IL (US); Xugang Shen, Beijing (CN); Jim Yongshun Jin, Beijing (CN); Jesse Hou, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/997,348

(22) Filed: Jan. 15, 2016

(65) Prior Publication Data
US 2017/0116122 A1    Apr. 27, 2017

Related U.S. Application Data

(63) Continuation of application No. PCT/CN2015/092523, filed on Oct. 22, 2015.

(51) Int. Cl.
*G06F 12/08* (2016.01)
*H04L 29/08* (2006.01)
(Continued)

(52) U.S. Cl.
CPC .......... *H04L 67/2842* (2013.01); *G06F 9/467* (2013.01); *G06F 12/0811* (2013.01);
(Continued)

(58) Field of Classification Search
CPC .................................................. G06F 12/0897
See application file for complete search history.

(56) References Cited

U.S. PATENT DOCUMENTS

| 5,515,492 A | 5/1996 | Li |
| 5,596,750 A | 1/1997 | Li |

(Continued)

FOREIGN PATENT DOCUMENTS

WO    2001038972    5/2001

OTHER PUBLICATIONS

United States Patent and Trademark Office, Notice of Allowance and Fee(s) Due for U.S. Appl. No. 14/997,349, 9 Pages.

(Continued)

*Primary Examiner* — Edward Dudek, Jr.
(74) *Attorney, Agent, or Firm* — Tucker Ellis LLP

(57) ABSTRACT

In accordance with an embodiment, described herein is a system and method for providing distributed caching in a transactional processing environment. The caching system can include a plurality of layers that provide a caching feature for a plurality of data types, and can be configured for use with a plurality of caching providers. A common data structure can be provided to store serialized bytes of each data type, and architecture information of a source platform executing a cache-setting application, so that a cache-getting application can use the information to convert the serialized bytes to a local format. A proxy server can be provided to act as a client to a distributed in-memory grid, and advertise services to a caching client, where each advertised service can match a cache in the distributed in-memory data grid, such as Coherence. The caching system can be used to cache results from a service.

18 Claims, 12 Drawing Sheets

(51) Int. Cl.
    *G06F 9/46*     (2006.01)
    *G06F 12/0811*     (2016.01)
    *G06F 12/0813*     (2016.01)
    *G06F 12/0897*     (2016.01)
    *G06F 12/10*     (2016.01)

(52) U.S. Cl.
    CPC ...... *G06F 12/0813* (2013.01); *G06F 12/0897* (2013.01); *G06F 12/10* (2013.01); *H04L 67/1097* (2013.01); *H04L 67/20* (2013.01); *G06F 2212/154* (2013.01); *G06F 2212/40* (2013.01); *G06F 2212/60* (2013.01); *G06F 2212/62* (2013.01)

(56) References Cited

U.S. PATENT DOCUMENTS

| | | |
|---|---|---|
| 6,269,432 B1 | 7/2001 | Smith |
| 6,681,251 B1 | 1/2004 | Leymann |
| 7,720,990 B2 | 5/2010 | Shen |
| 8,074,027 B2 | 12/2011 | Bradshaw |
| 8,255,626 B2 | 8/2012 | Blundell |
| 9,077,719 B2 | 7/2015 | Chouanard |
| 2004/0230747 A1* | 11/2004 | Ims ............... G06F 17/30902 711/133 |
| 2010/0198651 A1 | 8/2010 | Johnson |
| 2013/0086154 A1* | 4/2013 | Junnarkar ............ H04L 67/26 709/203 |
| 2013/0086238 A1 | 4/2013 | Li |
| 2013/0086271 A1 | 4/2013 | Li |
| 2014/0181833 A1 | 6/2014 | Bird |

OTHER PUBLICATIONS

International Searching Authority, State Intellectual Property Office of the People's Republic of China, Notification of Transmittal of the International Search Report and the Written Opinion of the International Searching Authority, or the Declaration dated Jul. 20, 2016 for International Application No. PCT/CN2015/092573, 13 Pages.

* cited by examiner

SYSTEM AND METHOD FOR INTEGRATING A DISTRIBUTED IN-MEMORY DATA GRID INTO A DISTRIBUTED CACHING SYSTEM IN A TRANSACTIONAL PROCESSING ENVIRONMENT

CLAIM OF PRIORITY

This application is a continuation of and claims the benefit of priority to International Application titled "SYSTEM AND METHOD FOR PROVIDING DISTRIBUTED CACHING IN A TRANSACTIONAL PROCESSING ENVIRONMENT", International Application No. PCT/CN2015/092523, filed Oct. 22, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for integrating a distributed in-memory data grid into a distributed caching system in a transactional processing environment.

BACKGROUND

In a transactional processing environment such as Tuxedo® server environment, it can be challenging to provide a distributed caching system for use in caching user-related or application data for performance improvement, as multiple data types can be used to transmit data between a client process and a server process, and different customers may prefer a different caching solution. These are the areas that embodiments of the inventions are intended to address.

SUMMARY

In accordance with an embodiment, described herein is a system and method for providing distributed caching in a transactional processing environment. A top layer can expose an application programming interface (API) for use by caching clients to interact with the caching system; and can register a plurality of buffer types and one or more callback functions for each buffer type. A common caching layer can support a common data structure, and when receiving the caching request from the top layer, use the callback functions therein to convert between a particular buffer type associated with the caching request and the common data structure. The common caching layer can define a set of common APIs to provide caching related APIs, and define common behaviors on a plurality of implementations, such as serialization/deserialization of key and value data. A provider switch and a related API can be used to load, from an implementation layer, a particular implementation of the provider switch, which can include pointers pointing to caching operations provided by a particular caching provider. A configuration file can be used to specify data coding and which caching provider to use for the caching system.

In accordance with an embodiment, described herein is a system and method for supporting data serialization for use by the distributed caching system. The data serialization system can include a common data structure, which can be used to store serialized stream/bytes of a plurality of data types. The data structure can comprise a header that contains information describing a cache setter's architecture. When the cached data is retrieved for use on a different architecture, the architecture information in the header can be used to convert the data for use on the different architecture. When the cached data is retrieved on a same architecture, the cached data can be used without any conversion. The data structure can additionally include a body of variable length for efficient use of memory, and version information for backward compatibility, and a field for optional features for extension.

In accordance with an embodiment, described herein is a system and method for integrating a distributed in-memory data grid, for example Coherence, into a distributed caching system as a caching provider. A proxy server in the distributing caching system can act as a client to the distributed in-memory data grid, and receive caching requests transferred from clients of the distributing caching system. At startup, the proxy server can load a configuration file that defines a caching system cache and maps that cache to a distributed in-memory data grid cache; and use a name of the caching system cache to advertise services. When receiving, from a caching client, a caching request specifying a requested service, the proxy server can determine the corresponding cache in the distributed in-memory data grid for access based on the requested service.

In accordance with an embodiment, described herein is a system and method for caching a returned result from a service, using a distributed caching system in a transactional processing environment. A configuration file can include a caching section with entries describing which cache to use for caching the result returned from the service, and how to generate a key for use in identifying the cached result. When a request for a service is received from a client, an application server core of the transactional processing environment can determine if a related cached result exists in a cache identified by a key generated using the configuration file. If yes, the application server core can return the cached result directly instead of invoking the service. Otherwise, the application server core can invoke the service, cache the data using a generated key, into a cache specified by the configuration file, and return the result to the client.

DETAILED DESCRIPTION

Figure 1:
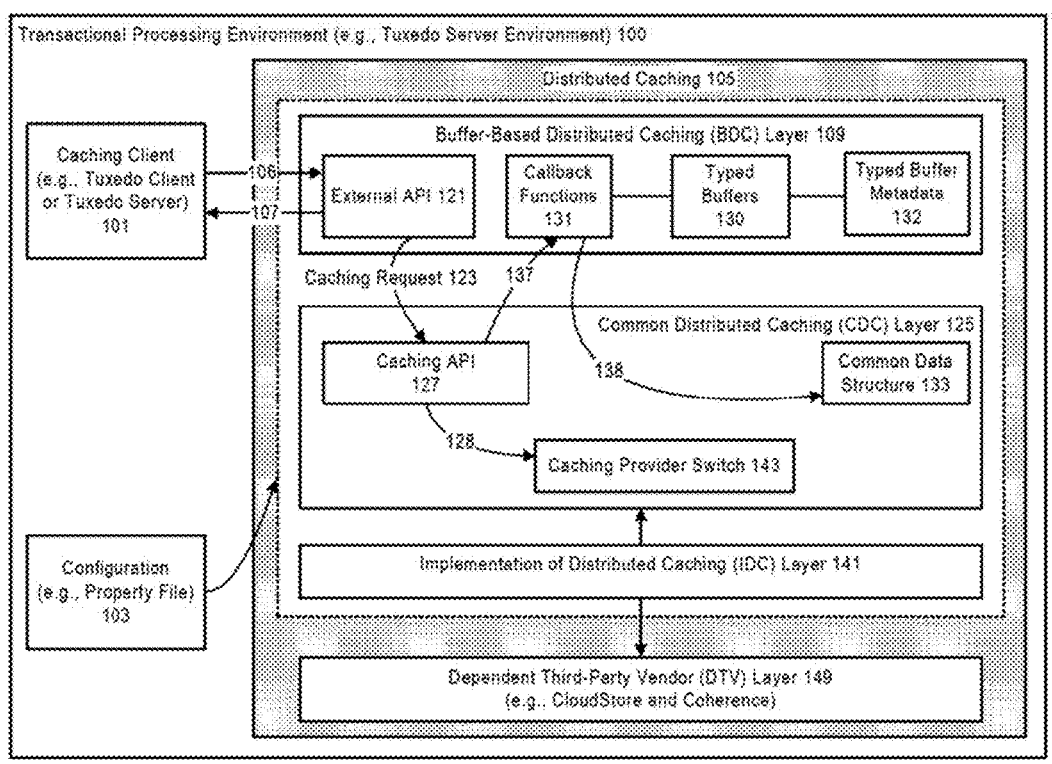
FIG. 1 illustrates a system for providing distributed caching in a transactional processing environment, in accordance with an embodiment.

In a transactional processing environment, for example a Tuxedo server environment, a buffer needs to be allocated before a message can be sent from one process to another. A complex application in such environment can be installed on heterogeneous systems that communicate across multiple networks using different protocols. As such, different types of buffers are needed, each buffer type requiring different routines to initialize, send and receive messages, and encode and decode data.

In accordance with an embodiment, a buffer can be a memory area that serves as a logical container for data. When a buffer contains no metadata it is an untyped buffer. When a buffer includes metadata such as information that can be stored in it (for example, a type and subtype, or string names that characterize a buffer), then it is a typed buffer. Typed buffers can be transmitted over a variety of networks, on various operating systems, with various protocols supported by a transactional processing system, such as a BEA Tuxedo system. Typed buffers can also be used on platforms with different data representations. As a result, the use of typed buffers facilitates the tasks of translation and data conversion between dissimilar machines.

Typically, when a user, for example an application developer, caches a typed buffer into a distributed caching system for performance improvement, the user needs to write customized code, for the particular typed buffer. Further, if a different caching provider is used after the development of the application is completed, additional code changes are needed to accommodate the caching provider change.

Distributed Caching System

In accordance with an embodiment, described herein is a system and method for providing distributed caching in a transactional processing environment. A top layer can expose an application programming interface (API) for use by caching clients to interact with the caching system; and can register a plurality of buffer types and one or more callback functions for each buffer type. A common caching layer can support a common data structure, and when receiving the caching request from the top layer, use the callback functions therein to convert between a particular buffer type associated with the caching request and the common data structure. The common caching layer can define a set of common APIs to provide caching related APIs, and define common behaviors on a plurality of implementations, such as serialization/deserialization of key and value data. A provider switch and a related API can be used to load, from an implementation layer, a particular implementation of the provider switch, which can include pointers pointing to caching operations provided by a particular caching providers. A configuration file can be used to specify data coding and which caching provider to use for the caching system.

The layered caching system can provide isolation between a user and the underlying caching provider, which makes the system easy to use, and easy to extend.

For example, the caching system can be used with a plurality of caching providers, and can cache a plurality of data types, without requiring changes to a user's application. Regardless of what buffer types a developer needs to cache, and which caching provider is configured for the caching system, the user can use the same set of APIs to perform caching operations.

In accordance with an embodiment, the distributed caching system can provide low access and update times, cache a plurality of types of buffers, each identified by a key, and offer replicated and non-replicated, and local and remote access.

FIG. 1 illustrates a system for providing distributed caching for use in a transactional processing environment, in accordance with an embodiment.

As shown in FIG. 1, a distributed caching system 105 can be provided in a transactional processing system (for example, a Tuxedo sever environment) 100, for use by a caching client (for example, a Tuxedo client or server) 101 to store data 106 in a cache or retrieve 107 the data from the cache.

As further shown in FIG. 1, the distributed caching system can include a plurality of layers, for example, a buffer-based distributed caching layer (BDC) 109, a common distributed caching (CDC) layer 125, an implementation of distributed caching (IDC) layer 141, and a dependent third-party vendor (DTV) layer 149. A configuration file 103 can be used to define behaviors of the BDC layer, the CDC layer and the IDC layer In accordance with an embodiment, the BDC layer is the top layer to the caching client and can handle a plurality of typed buffers, and transfer caching requirements from the caching client to the CDC layer, after converting a typed buffer to a common data structure supported by the CDC. A primary function of the top layer is the serialization and deserialization of various typed buffers.

As further shown in FIG. 1, the BDC layer can expose a set of external API 121 for use by the caching client to communicate with the caching system. For example, the external API can be directly used in an application to cache data or retrieve data from a cache.

Table 1 below illustrates a list of exemplary interfaces of the external API, in accordance with an embodiment.

TABLE 1

| | |
|---|---|
| TCACHE* tpgetcache(const char* name, long flags) | get a Tuxedo Cache handle according to a configuration |
| int tpcacheput(TCACHE* tc, char* key, char* data, long len, long flags) | put a Tuxedo typed buffer into a cache and associating that buffer with a key |
| int tpcacheget(TCACHE* tc, char* key, char** odata, long* olen, long flags) | get the Tuxedo typed buffer associated with the key from a cache |
| int tpcacheremove(TCACHE* tc, char* key, long flags) | remove the entry associated with the parameter key from a cache |
| int tpcachemremove(TCACHE* tc, char* keyarray[ ], int size, long flags) | remove entries associated with the parameter keyarray from a cache |
| int tpcacheremoveall(TCACHE* tc, long flags) | remove all entries from a cache |

As shown in Table 1, in accordance with an embodiment, the external API can include methods for an application to use in obtaining a handle to a cache, putting a buffer in the cache, associating the buffer with a key, and removing and retrieving the buffer from the cache.

For example, a user can use a method "tpgetcache" to get a Tuxedo Cache handle. The parameter "name" of the method can specify the name of the cache to be obtained. The returned result of the method can be a pointer pointing to a structure named TCACHE. "tpcacheput/tpcacheget" can be used to put/get data into/from a cache. "tpcacheremove/tpcachemremove/tpcacheremoveall" can be used to drop items from a cache.

In accordance with an embodiment, the BDC layer can register a plurality of typed buffers 130 as data types that can be cached in the caching system. For example, the plurality of typed buffers can include a string (a series of characters), a carray (a character array), a ptr (a pointer to a buffer), a FML typed buffer and a view typed buffer. Other data types can also be supported for caching if those data types are registered with the BDC layer.

As shown in FIG. 1, each registered typed buffer can be associated a metadata (for example, typed buffer metadata 132) describing the typed buffer, and one or more callback functions 131 that defines a plurality of operations on the buffer, including encoding and coding, and serialization and deserialization.

In accordance with an embodiment, the BDC layer can include a switch (a data structure), for each registered data type, that provides the metadata and callback functions.

Listing 1 below illustrates an exemplary switch in accordance with an embodiment.

Listing 1

```
struct tmtype_sw_t {
    char type[TMTYPELEN];          /* type of buffer */
    char subtype[TMSTYPELEN];      /* sub-type of buffer */
    long dfltsize;                 /* default size of buffer */
    /* buffer initialization function pointer */
    ...
    long (_TMDLLENTRY *presend) _((char _TM_FAR *,
    long, long));
    /* post-send buffer manipulation func pointer */
    void (_TMDLLENTRY *postsend) _((char _TM_FAR *,
    long, long));
    /* post-receive buffer manipulation func pointer*/
    long (_TMDLLENTRY *postrecv) _((char _TM_FAR *,
    long, long));
    /* encode/decode function pointer */
    long (_TMDLLENTRY *encdec) _((int, char _TM_FAR *,
long, char _TM_FAR *, long));
    /* routing function pointer */
    ...
};
```

As shown in Listing 1, the switch can include metadata describing the type, subtype and size of the buffer; and serialization operations "presend" and "presend2", deserialization operation "postrecv", and coding/encoding operations "encdec".

In accordance with an embodiment, the CDC layer can include a set of common APIs (for example, caching API 127) to provide caching related APIs, and define common behaviors on a plurality of implementations, such as serialization/deserialization of data comprising name/key value pairs. The CDC layer can serialize/deserialize a plurality of types of data by supporting callback registration for the implementation of serialization/deserialization.

In accordance with an embodiment, a common data structure (for example, a common typed buffer) 133 can be supported by the CDC layer, to store the serialized bytes of a typed buffer to be cached. Each of the registered typed buffers or other data types that are registered with the BDC layer can be serialized and stored in the common data structure.

In accordance with an embodiment, the CDC layer does not perform real caching operations; it defines the necessary interfaces. These interfaces do not depend on a specific implementation of caching operations. Based on a configuration, a particular implementation of these interfaces can be dynamically loaded from the IDC layer.

In accordance with an embodiment, a caching provider switch 143 and a specific method can be provided in the CDC layer, for use in retrieving a particular implementation of the provider switch, which can contain a plurality of pointers pointing to caching operations provided by a caching provider. The loading of each implementation of the provider switch can be initiated 128 by the caching API in response to a caching request from the BDC layer. Listing 2 below illustrates an exemplary provider switch, in accordance with an embodiment.

Listing 2

```
#ifndef __TMTDCInnerCache__type
#define __TMTDCInnerCache__type
/**
 * @brief structure of the inner cache offered by the implementation layer
 */
typedef struct __TMTDCInnerCache;
#endif
/**
 * @brief interface/switch definitions for all cache related operations.
 * The implementation of the switch may not depend on Tuxedo. Higher version
 *may offer more operations.
 */
typedef struct{
        int version; /**< version, must be 1*/
        int flags;   /**< flags, reserved, must be 0.*/
        /**< get internal cache handle*/
        TMTDCInnerCache* (*getcache)(TMProperties* prop, const char* cname);
        /**< check if a given feature is supported or not*/
        int (*issupported)(const char* feature);
        /**< put a key/value pair into the cache*/
        int (*put)(TMTDCInnerCache* ic, const TMTDCCacheKey* key, const
        TMTDCCacheValue* value, int flags);
        /**< get a value of a key from the cache*/
        int (*get)(TMTDCInnerCache* ic, const TMTDCCacheKey* key,
        TMTDCCacheValue* value, int flags);
        /**< remove a key from the cache*/
        int (*remove)(TMTDCInnerCache* ic, const TMTDCCacheKey* key, int flags);
        /**< remove a set of keys from the cache*/
        int (*removekeys)(TMTDCInnerCache* ic, const TMTDCCacheKey* keyarray, int
        size, int flags);
        /**< remove all keys from the cache*/
        int (*removeall)(TMTDCInnerCache* ic, int flags);
        /**< destroy internal cache handle*/
        int (*freecache)(TMTDCInnerCache* ic);
}TMTDCCachingProviderSwitch;
/**< get provider switch*/
typedef TMTDCCachingProviderSwitch*  (*TMTDCGetCachingProviderSW)(TMProperties*
prop);
```

As shown in Listing 2, the provider switch can include pointers to caching operations such as "put", "get" and "remove". The method "TMTDCGetCachingProviderSW" is the specific method used to retrieve the particular implementation of the caching interfaces, as defined by the configuration file.

Referring back to FIG. 1, the IDC layer can supply the actual caching operations, and can include a client and a server for each caching provider. As described above, each client can be an implementation of the provider switch, which can be provided for use by the CDC layer. The clients can be provided by one or more by dynamic libraries, so that each of the clients can be dynamically loaded into the CDC layer. The servers can use third-party applications as actual caching servers or providers. Each caching provider can have its own IDC implementation, which allows a user to change an IDC implementation through configurations without application code changes.

In the accordance with an embodiment, the DTV layer can include a plurality of third-party caching providers, for example Coherence and CloudStore.

In accordance with an embodiment, the BDC layer and the CDC layer can reside on both a client application to the transactional processing environment and a server therein, for example a Tuxedo client and a Tuxedo server; while the IDC layer and DTV layer can reside on the server only.

In accordance with an embodiment, the configure file can be a file in a simple line-oriented format. Properties in the configuration files can be processed in terms of lines, so that a new introduced property does not impact the loading process of the file. Table 2 illustrates a sample list of properties in the configuration file.

TABLE 2

| Property set | Description |
| --- | --- |
| provider.[xxx] | Properties used by a caching provider |
| options.[xxx] | Properties used by TDC options. |
| cache.[xxx] | Properties used by a cache |
| coh.[xxx] | Properties used by a caching provider implementation based on Oracle Coherence. |
| configfile | An URL which indicates importing properties from a property file pointed to by the value. For a local file, the value would be file:///path. The URl is taken as a local file if a protocol is not specified. If the property is not defined, the client would get a related configuration associated with a tuxedo service named by tdc.[cachename] |

TABLE 2-continued

| Property set | Description |
|---|---|
| options.encoding | 1 indicates that all caching data needs to be encoded. The property providing caching for users located in machines that have different data representations. It is set to 0 by default. Its value can be overridden by tdc.options.encoding.[cachename] |
| provider.default | Indicates the default provider name if it is specified in the configuration file. |
| cache | Indicates the [cachename] to be used. |
| provider.library.[providername] | Indicates the implementation library name used by the provider [providername]. If the library name is [xxx], the library would be libxxx.so in unix. |
| cache.provider.[cachename] | Indicates the provider id used by the cache [cachename]. The corresponding property "tdc.provider.library.[providername]" needs to be specified. |
| cache.options.encoding.[cachename] | 1 indicates all caching data in this cache needs to be encoded. If this property is not set, value of tdc.options.encoding is used. |
| coh.cache.name.[cache name] | Indicates the used cache name in the Coherence cluster for the Tuxedo cache [cachename]. It is necessary if the Tuxedo Cache based on Oracle Coherence is used. |

In accordance with an embodiment, the layered caching system can provide isolation between a user and the underlying caching provider, and allow a user to use a same set of interfaces to perform caching operations on the system.

As an illustrative example, when the BDC layer receives a caching request to cache a typed buffer from the caching client, the BDC layer can transfer 123 the caching request to the CDC layer, which can invoke 137 a corresponding callback function in the BDC layer to serialize the typed buffer and store 138 the serialized bytes into the common data structure. The CDC layer can use the common set of interfaces to access caching operations from a particular caching provider as specified by the configuration file, to perform caching operations.

Figure 2:
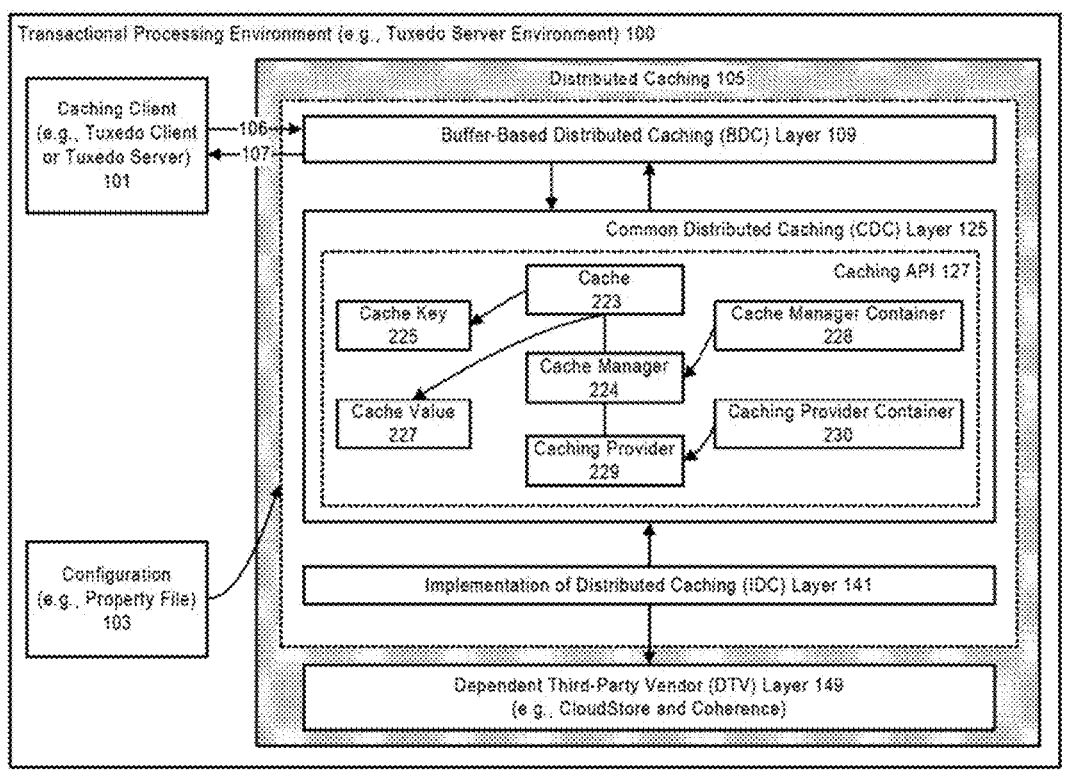
FIG. 2 further illustrates a system for providing distributed caching for use in a transactional processing environment, in accordance with an embodiment.

FIG. 2 further illustrates a system for providing distributed caching for use in a transactional processing environment, in accordance with an embodiment.

As shown in FIG. 2, the caching API in the CDC layer can further include a plurality of objects that define common caching interfaces and other common behaviors such as serialization and deserialization. Unlike the external API that is exposed to users, as described above, the caching API is provided for use by the caching system.

In accordance with an embodiment, the caching API can include a cache object 223, which can represent the cache obtained by a user of the external API. This cache can supply all cache related operations, and can receive caching operations from the external API. The cache can be identified by a cache name specified by, e.g., the "tdc.cache" property of the configuration file.

As shown in FIG. 2, the cache object can be associated with a cache key object 225, and a cache value object 227. The cache key object can include methods to generate and retrieve a key for a cache, and the cache value object can include a serialization interface.

In accordance with an embodiment, a caching provider 229 can define a set of caching operations identified by a provider name, as specified by the property cache.provider in the configuration file. A global cache provider container 230 maintained in a process-level context (TUXP) can implicitly maintain all the caching providers. A cache manager 224 can be used to manage caches in the transactional processing environment. A cache manager, which can be created implicitly when a user is to directly create a cache, can be associated with a single caching provider. When a cache manager is created, the associated caching provider can be created internally if the caching provider does not exist. A global cache manager container 228 can be maintained in a thread-level context (TUXT), to manage the managers created implicitly within a thread.

Figure 3:
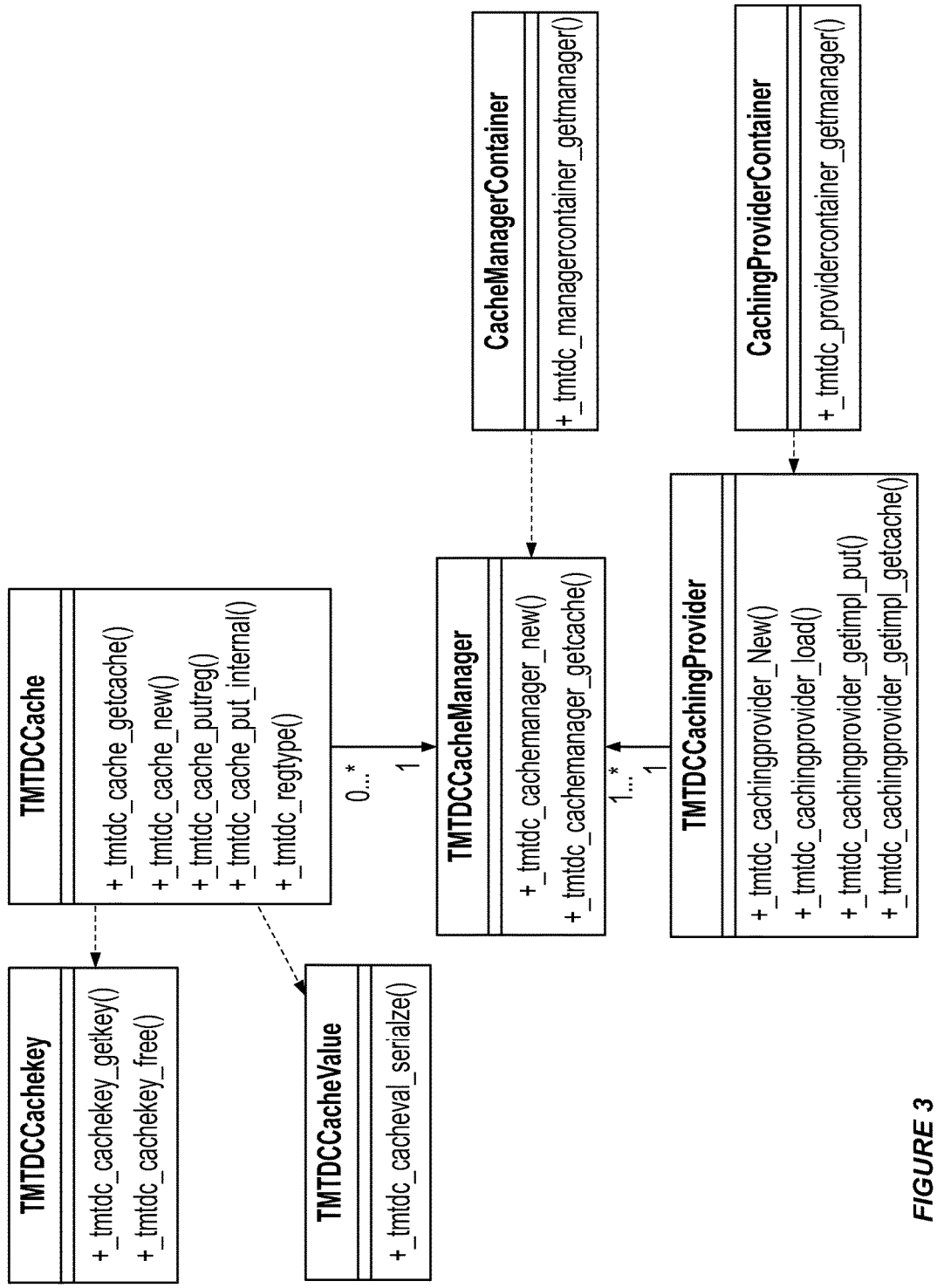
FIG. 3 illustrates a detailed class diagram of the caching API, in accordance with an embodiment.

FIG. 3 illustrates a detailed class diagram of the caching API, in accordance with an embodiment.

Figure 4:
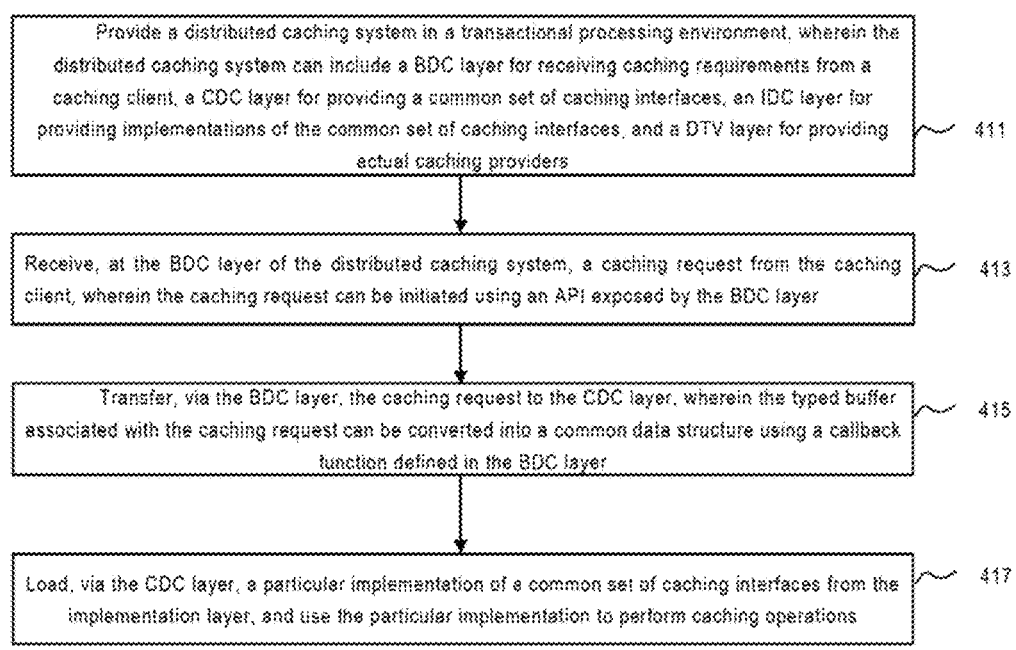
FIG. 4 illustrates a method for providing distributed caching for use in a transactional processing environment, in accordance with an embodiment.

FIG. 4 illustrates a method for providing distributed caching for use in a transactional processing environment, in accordance with an embodiment.

As shown in FIG. 4, at step 411, a distributed caching system can be provided in a transactional processing environment, wherein the distributed caching system can include a BDC layer for receiving caching requirements from a caching client, a CDC layer for providing a common set of caching interfaces, an IDC layer for providing implementations of the common set of caching interfaces, and a DTV layer for providing actual caching providers.

At step 413, the BDC layer of the distributed caching system can receive a caching request from the caching client, wherein the caching request can be initiated using an API exposed by the BDC layer.

At step 415, the BDC layer can transfer the caching request to the CDC layer, wherein the typed buffer associated with the caching request can be converted into a common data structure using a callback function defined in the BDC layer.

At step 417, the CDC layer can load a particular implementation of a common set of caching interfaces from the implementation layer, and use the particular implementation to perform caching operations.

Serialization Support

As described above, the CDC layer can define a registration function for callback functions, to invoke serialization/deserialization operations on typed buffers.

In accordance with an embodiment, a typed buffer or another data type needs to be register with the serialization/deserialization handler using the registration function. An example registration function can be as follows:

```
int _tmtdc_regtype(_TCADEF, int type, TMTDCCacheSerializeCB cb1,
TMTDCCacheDeserializeCB cb2, int flags)
```

In the above registration function, a serialization callback function (cb1) and a deserialization function (cb2) are registered. These callback functions, as described above, can be defined in the BDC layer; and can be illustrated in Listing 3 below.

---

Listing 3

```
/**
* @brief serialize callback function for a user-defined type
* The function converts a user-defined data buffer into a serialized
* stream. It needs to be registered via _tmtdc_regtype with a given type
* before the type can be used.
* @param iptr [in] pointer pointed to user-defined buffer
* @param ilen [in] the length of the user-defined buffer
* @param optr [out] the buffer to store the output data
* @param osize [in] indicates the size of the output buffer as the input or
* the real size of the output data as the output
* @param arg [in] the additional parameter used by the callback
* @param flag [in|out] as input, the possible value can be<p/>
* TDC_SERIALIZER_ENCODE indicates to do encoding<p/>
* as output, the possible value may be<p/>
* TDC_SERIALIZER_USEIPTR indicates the serialized data is in the
* buffer referenced by iptr<p/>
* TDC_SERIALIZER_USEOPTR indicates that the serialized data is
*in the buffer referenced by optr.
* @retval positive the length of the output data
* @retval -1 errors
* @retval negative indicates a larger buffer is needed and the negative
*absolute value is the desired buffer size
*
* @see _tmtdc_regtype
*/
typedef int (* TMTDCCacheSerializeCB) (char* iptr,  int ilen,
char*  optr, int osize, void* arg, int* flag);
/**
* @brief deserizlize callback function for a user-defined type
* The function converts a stream into a user-defined data buffer. It needs
* be registered via _tmtdc_regtype with a given type before the type
* can be used.
* @param iptr [in] pointer pointed to user-defined buffer
* @param ilen [in] the length of the user-defined buffer
* @param optr [out] the buffer to store the output data
* @param osize [in] indicates the size of the output buffer
* @param arg [in] the additional parameter used by the callback
* @param flag [in] the possible value can be<p/>
* TDC_SERIALIZER_ENCODE indicates to do decoding<p/>
* @retval positive the length of the output data
* @retval -1 errors
* @retval negative indicates a larger buffer is needed and the negative
* absolute value is the desired buffer size
* @see _tmtdc_regtype
*/
typedef int (*TMTDCCacheDeserializeCB)( char* iptr,  int ilen,
char*  optr, int osize, void* arg,  int flag);
```

---

As shown in Listing 3, a registered typed buffer or another user-defined data type can be converted into a serialized stream, and be stored in a cache. The serialized stream can subsequently be converted back into the user-defined data buffer after being retrieved from the cache.

To support a wide variety of data types, including typed buffers, for use in the distributed caching system, a common data structure can be provided to store serialized streams of these data types.

In accordance with an embodiment, described herein is a system and method for supporting data serialization for use by the distributed caching system. The data serialization system can include a common data structure, which can be used to store serialized stream/bytes of a plurality of data types. The data structure can comprise a header that contains information describing a cache setter's architecture. When a cached result is retrieved for use on a different architecture, the architecture information in the header can be used to convert the cached result for use on the different architecture. When the cached result is retrieved on a same architecture, the cached result can be used without any conversion. The data structure can additionally include a body of variable length for efficient use of memory, and version information for backward compatibility, and a field for optional features for extension.

Figure 5:
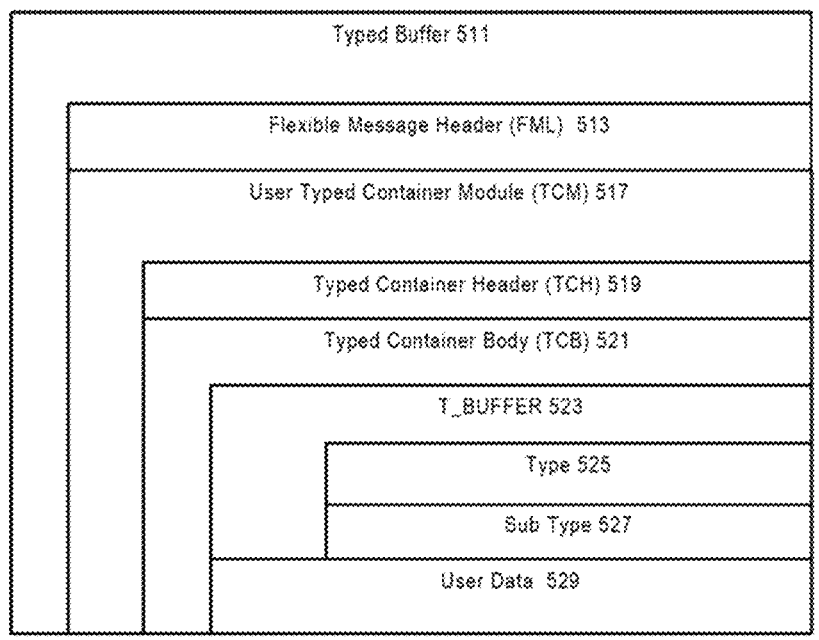
FIG. 5 illustrates an exemplary typed buffer in accordance with an embodiment.

FIG. 5 illustrates an exemplary typed buffer in accordance with an embodiment.

As shown in FIG. 5, a typed buffer (for example, a Tuxedo typed buffer) 511 can include a flexible message header (FMH) 513, and a user typed container module (TCM) 517. The TCM can further include a typed container header (TCH) 519, and a typed container body (TCB) 521. The TCB can include a T_BUFFER 523 and a user data 529. The T_BUFFER can be used to store a type 525 and a subtype 527 of the typed buffer. A typed buffer can have several non-user TCMs which can be stored in other buffers.

Figure 6:
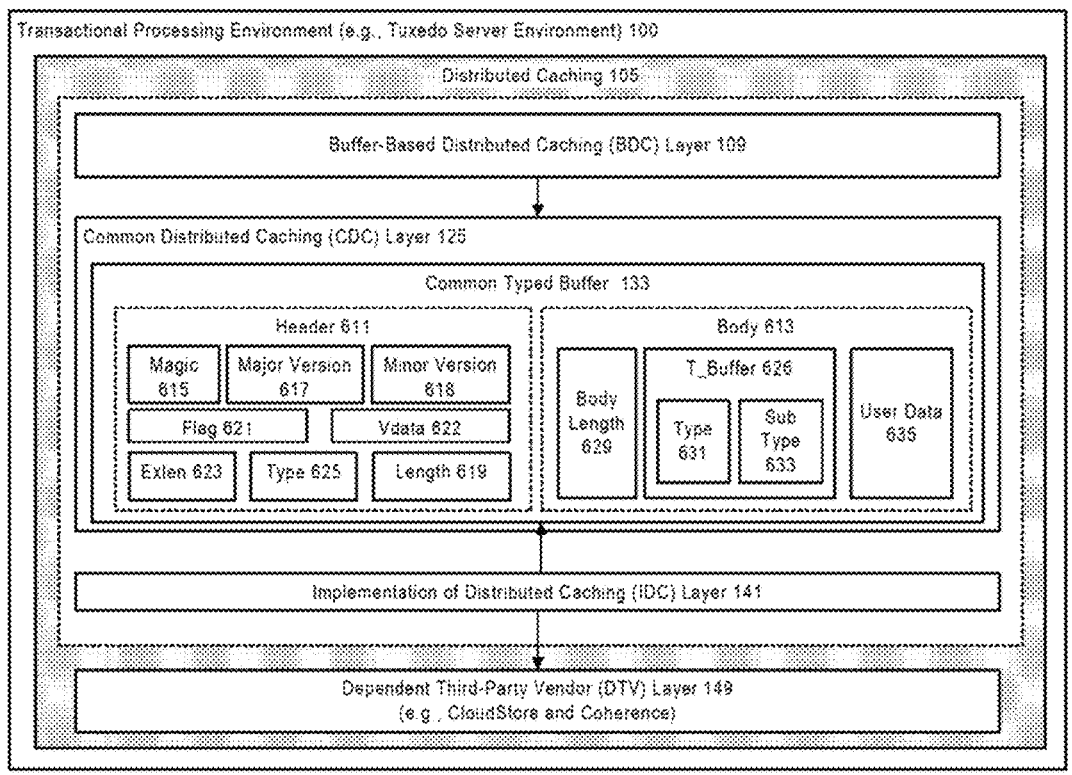
FIG. 6 illustrates a system for supporting data serialization for use by a distributed caching system, in accordance with an embodiment.

FIG. 6 illustrates a system for supporting data serialization for use by a distributed caching system, in accordance with an embodiment.

As shown in FIG. 6, the data structure can be the common typed buffer 133 supported by the CDC layer. The data structure can include a header 611 and a body 613, and can include a plurality of fields, for example a magic field 615, a major version field 617, a minor version field 618, a length field 619, a vdata field 622, an exlen field 623, a type field 625, and a flag field 621.

In accordance with an embodiment, the body can include a field of length 629 to indicate the size of the body, a field of T_Buffer 626 used to store a type 631 and subtype 633 of a source typed buffer, and a user data field 635.

In accordance with an embodiment, the field of "magic" can be a char used for distinguishing the header, the field of length can indicate the size of header. The field of flag can indicate a status or control optional features in the field of major version. The field of major version can indicate a structure change in the data structure; for example, a new field/member is added or removed, or the meaning of a field is changed. The field of minor version can be used to indicate a change within a major version; for example, a new bit flag is introduced into the field of flag.

In accordance with an embodiment, the field of exlen can describe any extra header data (for example, optional features) that generally would not be included in the header. If "exlen" is not zero, the first "exlen"*4 bytes beginning from the place holder "vdata" can be part of the header data. The extra header data can have various fields, and each field can begin from a 4 bytes-aligned address, use the first short as an unsigned short which indicates the type of that, use the second short as an unsigned short which indicates length (bytes) of the field's data, and be serialized.

In accordance with an embodiment, the field of vdata can be a place holder to indicate the variable data, including the extra header data and the body. The first four bytes of the header may not be changed for any other usage, and members in the header can use big-endian (vdata is not included). The size of the header does not include the variable data, and as such, does not impact the field of length.

In accordance with an embodiment, the fields of major version, length and flag can be used to support protocol compatibility between major versions. In addition, the field of flag can indicate the status of the data, which can one of unencoded, encoded and self-described.

In accordance with an embodiment, when the data is unencoded, no operations are performed during the serialization, and the body can be the same as the original user TCM in a typed buffer. The cache getter (for example, an application that retrieves the cached data) residing in a machine of a same architecture (for example, a same character encoding or a same endian) with the cache setter (for example, an application that stores the data in the cache) can retrieve and use the cached data.

In accordance with an embodiment, when a data is encoded, the original user TCM in a typed buffer is serialized using a particular encoding mechanism, so that a cache getter on any platform can obtain the data correctly, if the cache getter uses an appropriate corresponding mechanism to deserialize the data.

In accordance with an embodiment, the data structure described herein can provide a "self-described" mode or status, which allows the body of the data structure to be the same as the original user TCM in the typed buffer, for example, in an "unencoded" state. Further, additional information for the original architecture of a cache setter can be included in the header of the data structure. When a cache getter located in a different architecture gets the cached data, the data can be converted for use in the different architecture using the additional information. When a cache getter is located in a same architecture as the cache setter, the data can be used directly without any conversion.

In accordance with an embodiment, the data structure can still support the "encoded" mode, so that a data can be shared with other products that support Tuxedo encoding algorithm. An example scenario can be that a Tuxedo application works as a cache setter, while a WebLogic application using JATMI package works as a cache getter.

In accordance with an embodiment, architectures can be heterogeneous due to one or more of: 1) a different endian (byte order, little endian or big endian); 2) a different character set (ASCII, EBCDIC and so on); 3) a different size of a type (for example, long can be 4 bytes or 8 bytes); and 4) a different floating point representation.

In accordance with an embodiment, when the "self-described" state is used, information for architectural differences can be specified in the header of the data structure. In a heterogeneous environment, the "self-described" mode has two advantages compared with the encoding mode: 1) same performance as the "unencoded" for a cache setter; and 2) same performance as the "unencoded" for the cache getter if the getter located in same architecture as the cache getter.

As an illustrative example, a cache setter can use the data structure to store serialized bytes in a cache in their own format (for example big endian or little endian), and additional information specifying which "endian" the data is in. The cache getter, once retrieving the data, can use the additional information to convert the data into a local format if needed.

In accordance with an embodiment, in a heterogeneous environment, a library can be provided to each machine, so that a receiving machine can use the library to convert a cached data regardless of the architecture of the machine of the cache setter.

As such, the data structure can improve performance of the caching system, and can store the serialized bytes of a wide variety of data types, including Tuxedo typed buffers.

In accordance with an embodiment, two steps can be performed to serialize a user TCM of a typed buffer. The first step is representation and the second is encoding. As described above, the functions for serialization and deserialization are implemented in the callback functions in the BDC layer.

In accordance with an embodiment, although the user TCM of a typed buffer can be serialized, only the T-Buffer and user data of the typed buffer need to be cached to reduce unnecessary data; the rest of the typed buffer does not need to be cached.

Listing 4 illustrates an exemplary header of a typed buffer in accordance with an embodiment.

Listing 4

```
typedef
  struct{
    char magic;              /**< magic char, 0x0D
                                  (tuxedo13c)*/
    unsigned char majorversion;  /**< major version, 1-511*/
    unsigned char minorversion;  /**< minor version, 0-511*/
    unsigned char len;       /**< integers(4 bytes) used by
                                  the header*/
    TM32I flag;              /**< flags, 0x01 - body encoding */
    unsigned short exlen;    /**< integers(4 bytes) used by the
                                  header extension/
    unsigned short type;     /**< data type*/
    TM32I vdatalen;          /**< vdata length */
    char vdata[4];           /**< place holder for body*/
}TMTDCCacheDataBuffer;
```

Figure 7:
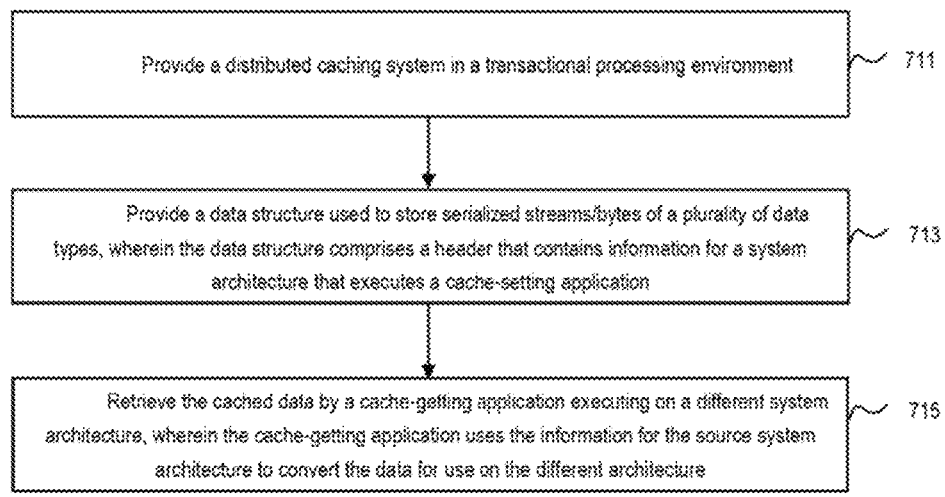
FIG. 7 illustrates a method for supporting data serialization for use by a distributed caching system, in accordance with an embodiment.

FIG. 7 illustrates a method for supporting data serialization for use by a distributed caching system, in accordance with an embodiment.

As shown in FIG. 7, at step 711, a distributed caching system can be provided in a transactional processing environment.

At step 713, a data structure used to store serialized streams/bytes of a plurality of data types can be provided, wherein the data structure comprises a header that contains information for a system architecture that executes a cache-setting application.

At step 715, a cache-getting application executing on a different system architecture retrieves the cached data, and uses the information for the source system architecture to convert the data for use on the different architecture.

Integration with Coherence

In accordance with an embodiment, a caching provider, for example Coherence or CloudStore, can be used as a caching provider through configurations.

In accordance with an embodiment, described herein is a system and method for integrating a distributed in-memory data grid, for example Coherence, into a distributed caching system as a caching provider. A proxy server in the distributing caching system can act as a client to the distributed in-memory data grid, and receive caching requests transferred from clients of the distributing caching system. At startup, the proxy server can load a configuration file that defines a caching system cache and maps that cache to a distributed in-memory data grid cache; and use a name of the caching system cache to advertise services. When receiving, from a caching client, a caching request specifying a requested service, the proxy server can determine the corresponding cache in the distributed in-memory data grid for access based on the requested service.

In accordance with an embodiment, data to be cached can be serialized before transferring to the proxy server, which can store the serialized data into the corresponding in-memory data grid cache. When the cached data is retrieved from the corresponding in-memory data grid cache as serialized bytes and sent back to the caching client, the caching client can deserialize the data into the original data.

Figure 8:
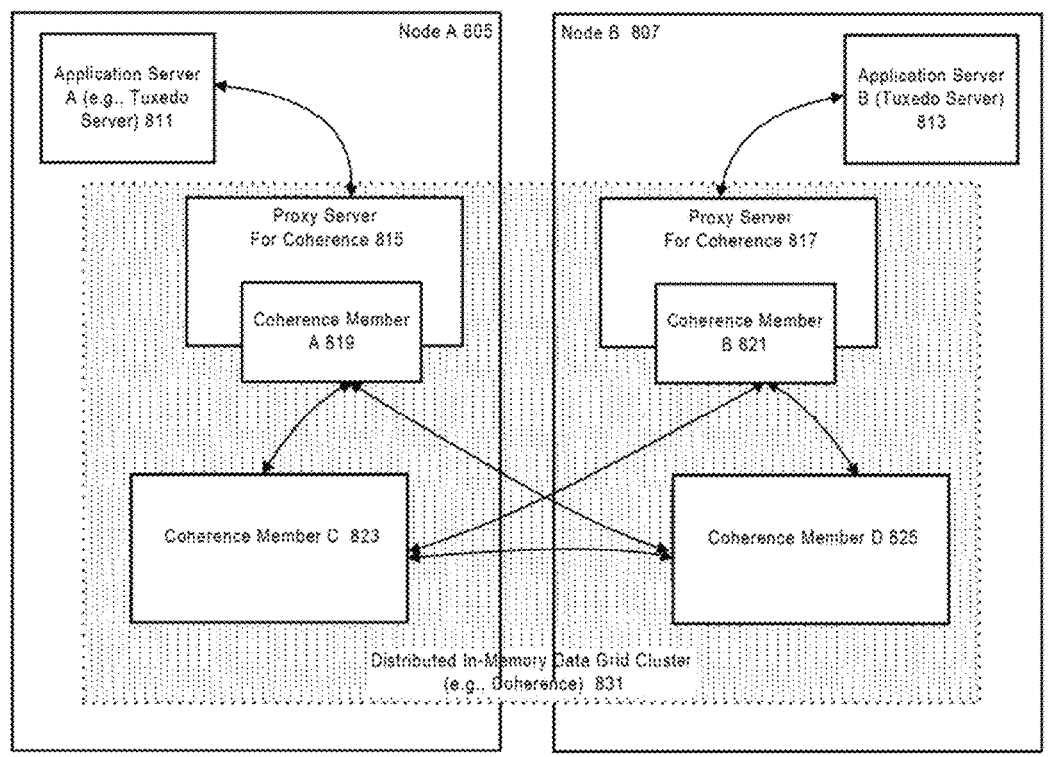
FIG. 8 illustrates a system for integrating a distributed in-memory data grid into a distributed caching system as a caching provider, in accordance with an embodiment.

FIG. 8 illustrates a system for integrating a distributed in-memory data grid into a distributed caching system as a caching provider, in accordance with an embodiment.

As shown in FIG. 8, a plurality of computer nodes (for example, Node A 805 and Node B 807) can be configured to work in a cluster or in a domain, in a transactional processing environment (for example, a Tuxedo server environment), wherein each computer node can include an application server (for example, application server A 811 and application B 813).

As further shown in FIG. 8, a distributed in-memory data grid cluster (for example, Coherence) 831 can be supported on the plurality of computer nodes. The distributed in-memory data grid can include a plurality of members distributed across the plurality of computer nodes. For example, Coherence members A 819 and C 823 cam reside on computer node A, and coherence members B 821 and D 825 can reside on computer node B.

In accordance with an embodiment, one or more proxy servers can be provided on each computer node, for load balancing and performance improvement. For example, proxy servers for Coherence 815 and 817 are provided respectively on computer nodes A and B.

In accordance with an embodiment, each proxy server can be implemented by a Tuxedo Java server, and works as a server in the distributed caching system. Caching requests from a caching client (for example, a Tuxedo client or server) can be transferred to each proxy server by a transactional procedural call. Each proxy can subsequently transfer one or more caching requests to a distributed in-memory data grid, and receive a corresponding reply.

In accordance with an embodiment, each proxy server can work directly as a Java client to the distributed in-memory data grid. The configuration file can specify how to access the distributed in-memory data grid, for example, whether to access one or more distributed caches or replicated caches. For high read access and low write access, replicated caches can be configured for access.

Figure 9:
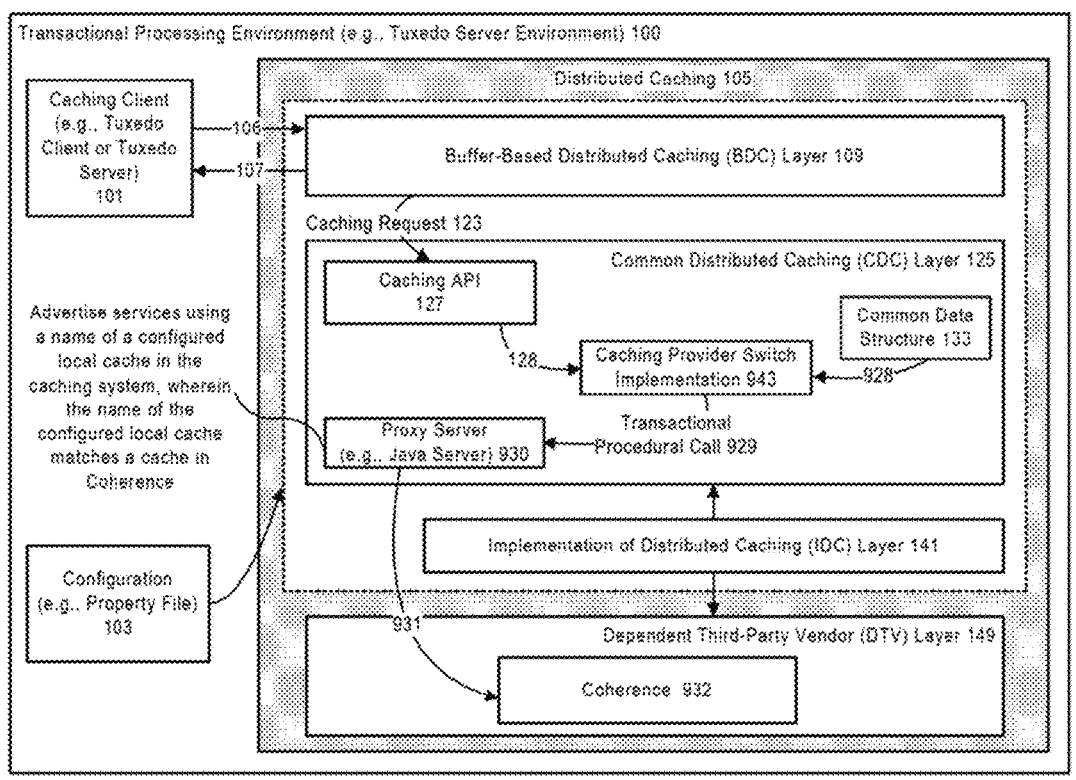
FIG. 9 further illustrates a system for integrating a distributed in-memory data grid into a distributed caching system as a caching provider, in accordance with an embodiment.

FIG. 9 further illustrates a system for integrating a distributed in-memory data grid into a distributed caching system as a caching provider, in accordance with an embodiment.

As shown in FIG. 9, the proxy server 930 can reside in the CDC layer to receive a transactional procedural call 929 from a caching provider switch implementation 943 for Coherence. The transactional procedural call can be generated by a server hosting the caching provider switch implementation after receiving a caching request from a caching client to the distributed caching system. The transactional procedural call can include the serialized bytes from 928 the common data structure.

In accordance with an embodiment, the caching provider implementation for Coherence can be an IDC client that is provided to the CDC layer from the IDC layer. Coherence 932 can be configured to be the default caching provider; and as such, the implementation of the provider switch and the method used to load the provider switch implementation can be integrated into the Tuxedo dynamic library libtux and libws, wherein the former can be used by Tuxedo servers and native clients, and the latter can be used for Tuxedo/WS clients.

In accordance with an embodiment, the provider switch implementation or the IDC client based on Coherence can transfer the caching request to the proxy server by tpcall. Different buffer types can be used, based on types of requests to reduce unnecessary copy. Table 3 illustrates a sample list of typed buffers that can be used based on types of caching requests.

TABLE 3

| Request type/command | User TCM | MetaTCM (type of FML32) |
| --- | --- | --- |
| Getcache | STRING(empty) | Stores the Command |
| Put | CARRAY (stores data to be cached) | Stores the Command and key |
| Get | STRING (stores the key) | Stores the command |
| Remove | STRING (stores the key) | Stores the command |
| Mremove | STRING (empty) | Stores the Command and Key array |
| Removeall | STRING (empty) | Stores the Command |

In accordance with an embodiment, when the proxy server starts up, it can load configuration properties from the configuration file, wherein the configuration properties can define a provided Tuxedo cache, which can be a configured logical cache or a physical cache in the distributed caching system. The proxy server can advertise services using the Tuxedo cache name. An example list of properties from the configuration file can be shown in Listing 5 below.

Listing 5

```
#global option encoding setting
#options.encoding=no
#* configurations for Tuxedo cache "tc"
#* option encoding setting
#cache.options.encoding.tc=no
#* physical cache used in Oracle Coherence
coh.cache.name.tc=tux_distributed
#* configurations for Tuxedo cache "tc2"
#* option encoding setting
#cache.options.encoding.tc2=no
#* physical cache used in Oracle Coherence
#coh.cache.name.tc2=tux2_distributed
```

In accordance with an embodiment, with the properties above, the proxy server can advertise a Tuxedo service named "tc". The IDC client can transfer a request for the cache "tc" to the service "tc" advertised by the proxy server by tpcall. As shown in Listing 3, the properties can specify a mapped Coherence cache for a configured cache in the distributed caching system. When a caching client needs to obtain a cache by the command "getcache", the proxy server can send back all necessary properties, for example, the property options.encoding, for this cache to the caching client.

In accordance with an embodiment, the proxy server can determine the Coherence cache name based on the requested service, as the name of the requested service can be the same as the name of the Tuxedo cache that has been mapped to the Coherence cache through the configuration file.

In accordance with an embodiment, the proxy server can work as a client of the Coherence. It can be a native client (a member of Coherence cluster) or a remote client, as defined by the Coherence configuration file used by the proxy serve.

In accordance with an embodiment, the Coherence cache can be a distributed cache, a local cache or any other types of cache, as determined by requirements of an application.

In accordance with an embodiment, when a command, for example "put", is invoked in an application to store data in a cache, the data can be serialized before transferring to the proxy server. When the proxy server receives the serialized data that can be the type of byte[ ], the proxy server can store the serialized data into Coherence.

Similarly, when a command, for example "get", is invoked in an application to retrieve data from a cache, the cached data can be retrieved from Coherence with the type of byte[ ], and sent back to the caching client, which can deserialize the data into its original format.

Figure 10:
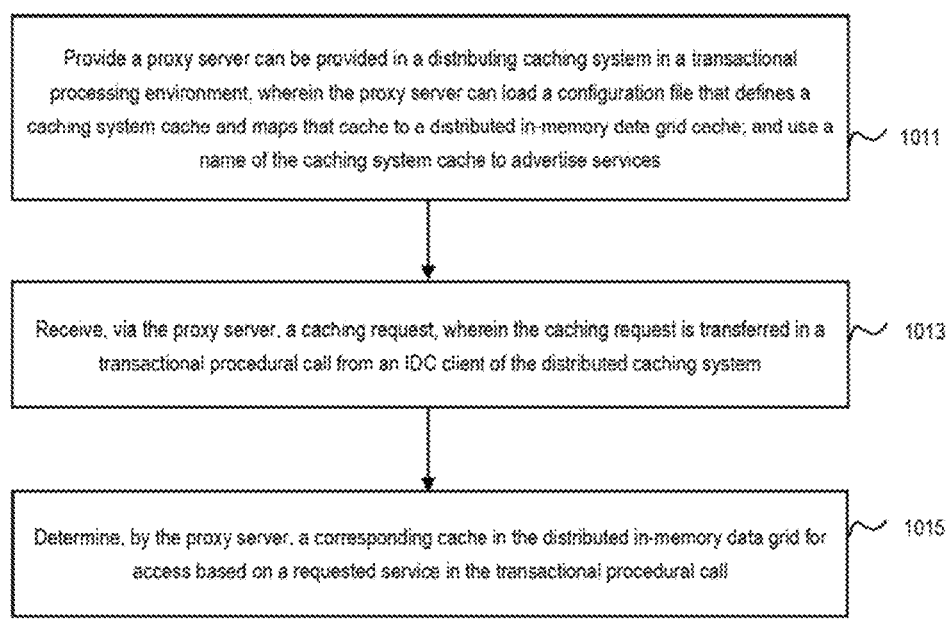
FIG. 10 illustrates a method for integrating a distributed in-memory data grid into a distributed caching system as a caching provider, in accordance with an embodiment.

FIG. 10 illustrates a method for integrating a distributed in-memory data grid into a distributed caching system as a caching provider, in accordance with an embodiment.

As shown in FIG. 10, at step 1011, a proxy server can be provided in a distributing caching system in a transactional processing environment, wherein the proxy server can load a configuration file that defines a caching system cache and maps that cache to a distributed in-memory data grid cache; and use a name of the caching system cache to advertise services.

At step 1013, the proxy server can receive a caching request, wherein the caching request is transferred in a transactional procedural call from an IDC client of the distributed caching system.

At step 1015, the proxy server can determine a corresponding cache in the distributed in-memory data grid for access based on a requested service in the transactional procedural call.

Service Caching

The distributed caching system described above can provide a caching feature that provides extremely low access and update times, can cache Tuxedo buffers identified by a key, and offers services of variable quality, including replicated and non-replicated as well as local and remote access.

In accordance with an embodiment, described herein is a system and method for caching a returned result from a service, using a distributed caching system in a transactional processing environment. A configuration file can include a caching section with entries describing which cache to use for caching the result returned from the service, and how to generate a key for use in identifying the cached result. When a request for a service is received from a client, an application server core of the transactional processing environment can determine if related cached data exists in a cache identified by a key generated using the configuration file. If yes, the application server core can return the cached data directly instead of invoking the service. Otherwise, the application server core can invoke the service, cache the data using a generated key, into a cache specified by the configuration file, and return the result to the client.

In accordance with an embodiment, returned results of services to be cached can be search results from a database based on input key words in service requests.

When a service, for example, a Tuxedo service may spend a relatively long time in returning a same result in response to a particular request within a period of time, the service caching feature can significantly improve the system performance. In addition, this caching feature allows users to cache returned results from a service without changing any existing code.

In accordance with an embodiment, the configuration file can specify how to generate a key to be used to identify a cached result. A key for such identifying purpose can be one of a simple solid string, a string composed from the service name, a string composed from the request data, and a string composed from the service name and request data.

In accordance with an embodiment, if a request data is to be used to generate a key, either the total request data or part of the data can be used as part of the key according to the typed buffer containing the request data. Users can use:
 1). part of a STRING/CARRAY buffer identified by start/end indicators;
 2). one or some fields of a VIEW/VIEW32 buffer;
 3). one or some fields of a FML/FML32 buffer; or
 4). one or some fields of a record buffer.

In accordance with an embodiment, in a transactional processing environment, a typed buffer, such as FML typed buffer, can include a plurality of sets of name value pairs. The typed buffer can be used to send a request from a client to a server and return a result from the server to the client. A cached service result can include the plurality of sets of name value pairs, which can include extraneous data for a specific caching request. For example, some of the cached name value pairs may not be needed for a particular request, although these name value pairs may be needed for subsequent caching request.

As such, in accordance with an embodiment, using keys generated from the request data can allow a client application to pinpoint the needed data and retrieve only those data, which can reduce access time and boost performance.

Figure 11:
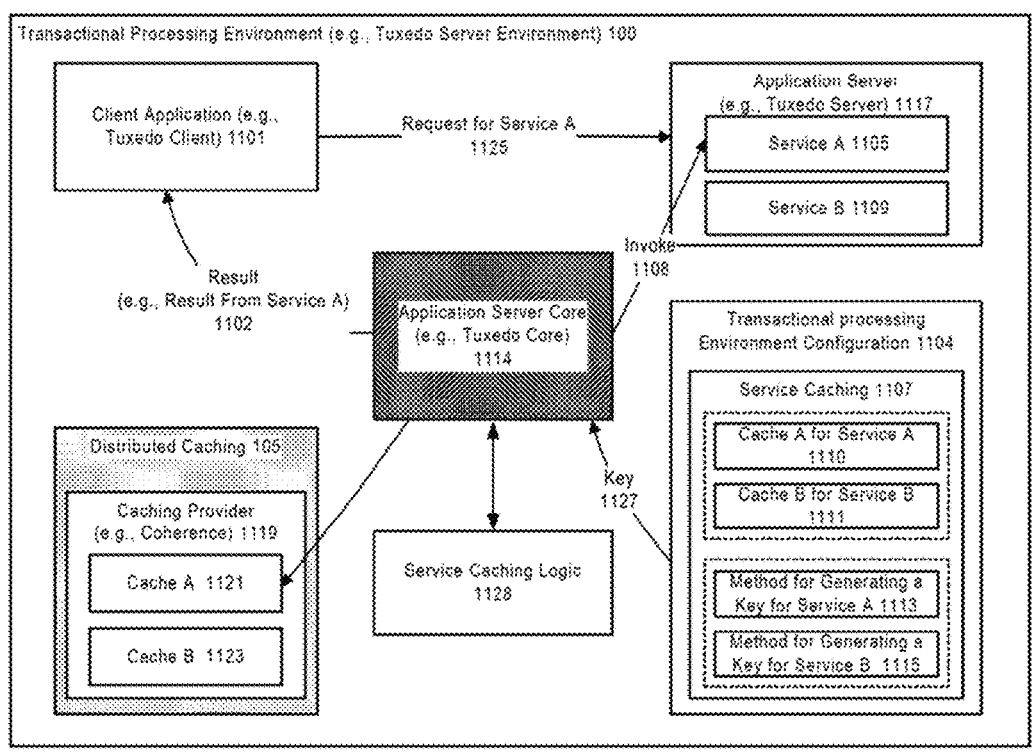
FIG. 11 illustrates a system for caching a returned result from a service, using a distributed caching system in a transactional processing environment, in accordance with an embodiment.

FIG. 11 illustrates a system for caching a returned result from a service, using a distributed caching system in a transactional processing environment, in accordance with an embodiment.

As shown in FIG. 11, the distributed caching system can be configured to use Coherence as the caching provider 1119, which can include a plurality of caches (for example, Cache A 1121 and Cache B 1123), either distributed or replicated.

As further shown, a configuration file 1104 for the transactional processing environment can include a service caching section 1107, which can include entries describing how to use the distributed caching system.

For example, the caching section can describe which cache to use for caching a returned from a particularly service, as illustrated by cache A 1110 for service A and cache B 1111 for service B.

In accordance with an embodiment, additional entries in the section can describe how to generate a key for use in identifying a cached result from a particularly service, as shown by method 1113 for generating a key for service A, and method 1115 for generating a key for service B. As described above, the key generating methods can define which fields of data in a request to use in generating the key, based on the type of buffers containing the request data.

Referring to FIG. 11, an application server core (for example, a Tuxedo core) 1114 can be provided to pass a returned result from a service 1102 to a client application (for example, a Tuxedo client) 1101. The application server core can be associated with an application server A (for example, a Tuxedo sever) 1117 that can execute a plurality of services (for example, service A 1105 and service B 1109). The application server core can also be associated with a service caching logic 1128 for use in determining whether to invoke a particular service for a result, or use a result cached in a cache.

As an illustrative example, when a request for service A 1125 is received by the application server, the application server core associated therewith can check a cache configured for the service A, to determine if there is related cached data in the cache, as identified by a key 1127 generated according to related entries for the service in the configuration file. If yes, the application sever core can return the cached data directly instead of invoking service A. If no, the application server core can invoke 1108 service A and return the result to the client application. Before transferring the result back to the client application, the application server core can cache the data using a generated key, into the cache configured for use by service A.

Figure 12:
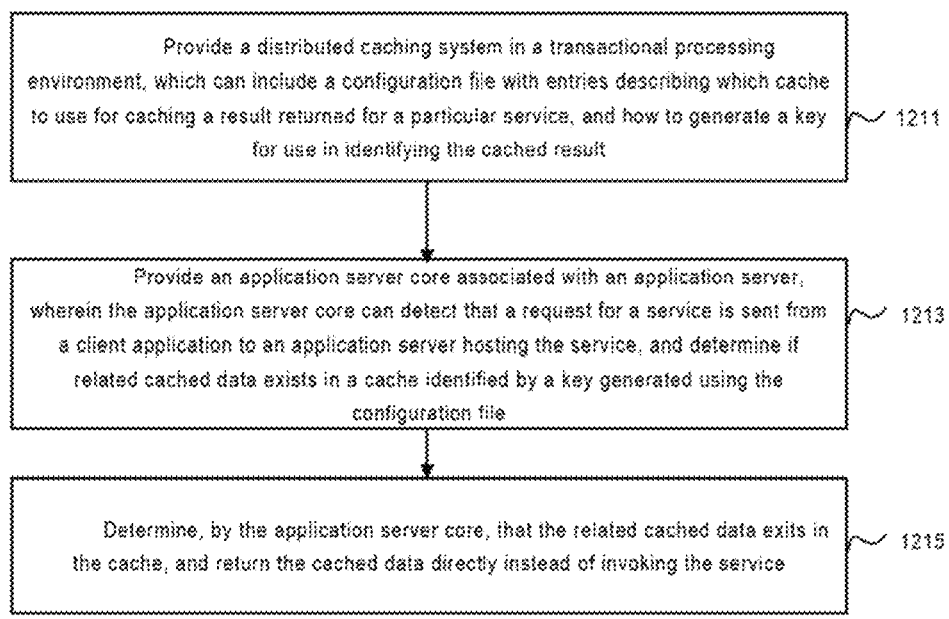
FIG. 12 illustrates a method for caching a returned result from a service, using a distributed caching system in a transactional processing environment, in accordance with an embodiment.

FIG. 12 illustrates a method for caching a returned result from a service, using a distributed caching system in a transactional processing environment, in accordance with an embodiment.

As shown in FIG. 12, at step 1211, a distributed caching system can be provided in a transactional processing environment, which can include a configuration file with entries describing which cache to use for caching a result returned for a particular service, and how to generate a key for use in identifying the cached result.

At step 1213, an application server core associated with an application server can detect that a request for a service is sent from a client application to an application server hosting the service, and determine if related cached data exists in a cache identified by a key generated using the configuration file.

At step 1215, when the related cached data exits in the cache, the application server core can return the cached data directly instead of invoking the service. Otherwise, the application server core can invoke the service, cache the data using a generated key, into a cache specified by the configuration file, and return the result to the client.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for integrating a distributed in-memory data grid into a transactional processing environment, the system comprising:
   a computer that includes one or more microprocessors;
   a transactional processing environment, executing on the computer, which includes a configuration file and a plurality of layers, wherein the configuration file and the plurality of layers enable the transactional processing environment to use a distributed in-memory data grid as a caching provider,
      wherein the configuration file defines a plurality of caches, and maps each of the plurality of defined caches to a physical cache in the distributed in-memory data grid, and
      wherein the plurality of layers includes a common data structure and a plurality of callback functions, and uses the plurality of callback functions to convert different buffer types in caching requests to the common data structure;
   a proxy server, in the transactional processing environment, that operates as a client to the in-memory data grid, and advertises one or more of the plurality of defined caches as services, for invocation by a client application to make caching requests to the transactional processing environment;
   wherein, the proxy server, in response to receiving from the client application a caching request, operates to
      determine, based on an advertised service used to make the caching request, a physical cache in the distributed in-memory data grid, and
      direct the caching request to the determined physical cache.

2. The system of claim 1, wherein the distributed in-memory data grid is Coherence.

3. The system of claim 1, wherein the proxy server advertises a service using a name of the defined cache.

4. The system of claim 1, wherein the proxy server determines the physical cache in the distributed in-memory data grid for use in performing caching operations associated with the caching request.

5. The system of claim 1, wherein one or more additional proxy servers are provided on each computer node hosting the distributed in-memory data grid for load balancing.

6. The system of claim 1, wherein the proxy server is a Java server.

7. A method for integrating a distributed in-memory data grid into a transactional processing environment, the method comprising:
   providing a transactional processing environment, executing on a computer including one or more microprocessors, which includes a configuration file and a plurality of layers, wherein the configuration file and the plurality of layers enable the transactional processing environment to use a distributed in-memory data grid as a caching provider,
      wherein the configuration file defines a plurality of caches, and maps each of the plurality of defined caches to a physical cache in the distributed in-memory data grid, and
      wherein the plurality of layers includes a common data structure and a plurality of callback functions, and uses the plurality of callback functions to convert different buffer types in caching requests to the common data structure;
   providing a proxy server, in the transactional processing environment, that operates as a client to the in-memory data grid, and advertises one or more of the plurality of defined caches as services, for invocation by a client application to make caching requests to the transactional processing environment;

receiving, at the proxy server, a caching request from the client application;

determining, based on an advertised service used to make the caching request, a physical cache in the distributed in-memory data grid; and directing the caching request to the determined physical cache.

8. The method of claim 7, wherein the distributed in-memory data grid is Coherence.

9. The method of claim 7, wherein the proxy server advertises a service using a name of the defined cache.

10. The method of claim 7, wherein the proxy server determines the physical cache in the distributed in-memory data grid for use in performing caching operations associated with the caching request.

11. The method of claim 7, wherein one or more additional proxy servers are provided on each computer node hosting the distributed in-memory data grid for load balancing.

12. The method of claim 7, wherein the proxy server is a Java server.

13. A non-transitory computer-readable storage medium storing a set of instructions for integrating a distributed in-memory data grid into a transactional processing environment, said instructions, when executed by one or more processors, causing the one or more processors to perform the steps comprising:

providing a transactional processing environment, executing on a computer including one or more microprocessors, which includes a configuration file and a plurality of layers, wherein the configuration file and the plurality of layers enable the transactional processing environment to use a distributed in-memory data grid as a caching provider, wherein the configuration file defines a plurality of caches, and maps each of the plurality of defined caches to a physical cache in the distributed in-memory data grid, and wherein the plurality of layers includes a common data structure and a plurality of callback functions, and uses the plurality of callback functions to convert different buffer types in caching requests to the common data structure;

providing a proxy server, in the transactional processing environment, that operates as a client to the in-memory data grid, and advertises one or more of the plurality of defined caches as services, for invocation by a client application to make caching requests to the transactional processing environment;

receiving, at the proxy server, a caching request from the client application;

determining, based on an advertised service used to make the caching request, a physical cache in the distributed in-memory data grid; and directing the caching request to the determined physical cache.

14. The non-transitory computer-readable storage medium of claim 13, wherein the distributed in-memory data grid is Coherence.

15. The non-transitory computer-readable storage medium of claim 13, wherein the proxy server advertises a service using a name of the defined cache.

16. The non-transitory computer-readable storage medium of claim 13, wherein the proxy server determines the physical cache in the distributed in-memory data grid for use in performing caching operations associated with the caching request.

17. The non-transitory computer-readable storage medium of claim 13, wherein one or more additional proxy servers are provided on each computer node hosting the distributed in-memory data grid for load balancing.

18. The non-transitory computer-readable storage medium of claim 13, wherein the proxy server is a Java server.

* * * * *

UNITED STATES PATENT AND TRADEMARK OFFICE
CERTIFICATE OF CORRECTION

PATENT NO. : 9,894,175 B2
APPLICATION NO. : 14/997348
DATED : February 13, 2018
INVENTOR(S) : Little et al.

It is certified that error appears in the above-identified patent and that said Letters Patent is hereby corrected as shown below:

In the Specification

In Column 5, Line 4, after "layer" insert -- . --.

In Column 11, Line 32, delete "deserizlize" and insert -- deserialize --, therefor.

Signed and Sealed this
Twenty-third Day of October, 2018

Andrei Iancu
*Director of the United States Patent and Trademark Office*